FIG. 6(B) PRESENT INVENTION ately along the side edges of the film. This is a considerable disadvantage producing waste and unsightliness in the final product.

United States Patent Office
3,491,402
Patented Jan. 27, 1970

3,491,402
APPARATUS FOR BIAXIALLY STRETCHING A FILM MATERIAL
Yoshifumi Shindo, Nobuyuki Takesue, and Tadashi Koyama, Kudamatsu-shi, Japan, assignors to Hitachi, Ltd., Chiyoda-ku, Tokyo-to, Japan
Filed May 25, 1967, Ser. No. 641,209
Int. Cl. B29c 17/02
U.S. Cl. 18—1                                    14 Claims

ABSTRACT OF THE DISCLOSURE

The biaxial stretching apparatus will stretch a plastic film or sheet by means of two lazy tong endless gripper mechanisms arranged on opposite sides of the sheet for simultaneously stretching a continuously moving heated sheet in its longitudinal and transverse direction. The lazy tong mechanism includes a primary lazy tong linkage having a secondary linkage mounted on the links of the primary linkage; the primary and secondary linkages each carrying a tenter or sheet gripper. The primary linkage is provided with a sprocket wheel engaging chain for pulling it in its extended position and spacer plates for pushing it in its collapsed position while maintaining proper spacing.

---

It is known that when crystalline polymers, such as crystalline polyethylene, polypropylene or the like, are stretched in mutually perpendicular directions, the strength of the polymer will be increased along the stretched directions, and the physical and optical properties of the material will be improved. In the prior art, apparatuses have been provided for simultaneously stretching a plastic film in the longitudinal and transverse directions of the film as it is continuously moved through the device. In these known devices, a pair of movable endless linkages or conveyers are provided on oppositely disposed sides of the continuously moving film. These linkages comprise a plurality of equal length links hinged together in a foldable lazy tong fashion. A plurality of tenter chips or film clamps are provided on the hinged portions of the link adjacent to the film, that is, on every second hinged portion. The linkages are guided either extended or expanded during their movement by a pair of guide slots or channels disposed on each side of the moving film. One of the guide slots or channels of the guide device is located adjacent to the film for guiding the hinged portions carrying the tenter chips and the other guide slot or channel is located away from the film to guide the other hinged portions that do not have tenter chips, for each of the linkages.

The guide device, composed of the pair of slots, for one linkage is mounted to increase in transverse spacing from the guide device of the other linkage in the direction of film travel within the stretching zone. Also, for each guide device, the pair of guide slots move closer to each other in the direction of film travel, to expand the linkage. Therefore, the film engaged by the plurality of tenter chips at both side edges is transversely stretched by the first mentioned diverging guide devices and longitudinally stretched by means of the second mentioned converging slots during its travel through the stretching zone. However, there is the considerable disadvantage in such a prior art mechanism that the tenter chips are located on only every second hinged connection and therefore produce a relatively large primary film gripping pitch; that is in the expanded position of the linkage, the tenter chips are located relatively far apart in the longitudinal direction. Therefore, the film will be stretched to the greatest extent immediately adjacent the tenter chips and to a lesser extent there between so that a contracted portion will be produced laterally of the film at every area on the film edge where the film is not gripped by a tenter chip to produce relatively large wave form shrinkages longitudin In the prior art apparatus, the links are only partially extended in the film stretching zone; that is, they are further extended to their full extended position after the film has been stretched, particularly in the return travel zone by means of the rear driving sprocket wheel. The spacing of the linkage has been regulated or controlled to produce a predetermined fixed pitch at each position of the linkage by means of the guide rails even during the return travel of the linkage, which are driven by caterpillar type chains; or the links have been regulated or controlled by only their own connections as they are pulled forwardly. When the links are regulated in their spacing by means of the guide rails, the force transmitted through the links for moving the links is dissipated by pressing the links outwardly against the guide rails in both directions so that a relatively large driving force is required and the link connections are subjected to excessively heavy loads. In the other devices where the lengths are pulled and held in position merely by their own connections, particularly in the return zone, and driven by the engagement of sprocket wheel teeth with the hinge pins of the links, there is the considerable disadvantage that the linkage becomes quite long in length so that the driving sprocket wheel must be correspondingly very large and high speed; the large size and high speed of the driving sprocket wheel are disadvantages of the prior art.

It is a primary object of the present invention to overcome the above mentioned disadvantages. The apparatus of the present invention will continuously and simultaneously biaxially stretch film and produce a considerably less deformation and shrinkage along the longitudinal side edges of the film. The linkage is provided with a plurality of film clamping devices, considerably greater than could be obtained with the prior art, to reduce the primary film gripping pitch and allow high speed operation.

Further features and advantages of the present invention will become more clear from the following detailed description of a preferred embodiment, in connection with the accompanying drawings wherein:

FIGURE 6(B) is a schematic illustration of the linkage according to the present invention shown stretching a film within the stretching zone;

Figure 1:
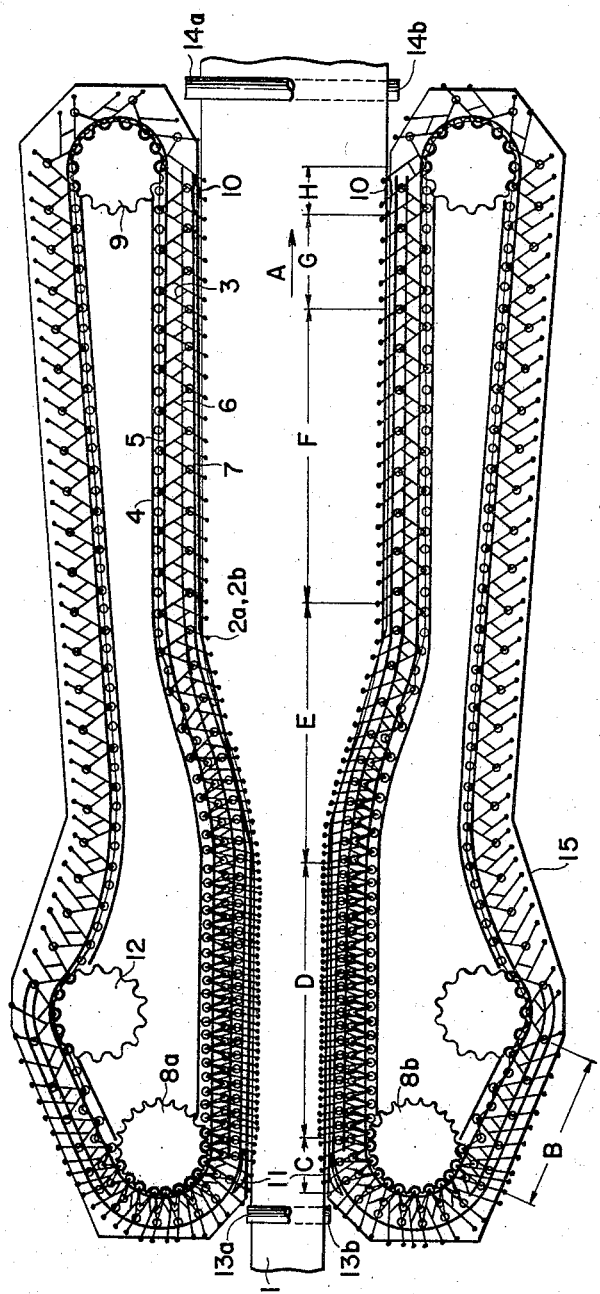
FIGURE 1 is a schematic plan view of a biaxial film stretching apparatus provided with the linkage mechanism according to the present invention.

As shown in FIGURE 1, the film 1 is fed through the apparatus by means of a pair of upper and lower feed rollers 13a and 13b, respectively, to a pair of endless linkages laterally spaced apart from each other. A plurality of tenter chips 2a, 2b are carried by the linkages 3 for automatically gripping and traveling with the side edges of the film 1. The linkages 3 are driven by means of sprocket wheels 8 and 12, which are continuously driven by means set forth in greater detail below.

Details of the linkages 3 are shown more clearly in FIGURES 2–5. The linkages 3 and the film 1 travel in the direction of arrow A, FIGURE 1, with the hinged portions of the linkages 3 being guided by and moving along guide rails 4, 5, 6 and 7 that are securely fixed to the bed 15 so that the film 1 is simultaneously biaxially stretched. When the film 1 is fed into zone C by the feed rollers 13a, 13b, the normally closed tenter chips 2a, 2b are automatically opened by means of the opening guide 11 to receive the edges of the film 1 and thereafter they are allowed to close and firmly grip the side edges of the film 1 at an equal spacing according to the primary gripping pitch. The gripped film is then moved into zone D where it is preheated to a predetermined temperature by means of a suitable heating device (not shown). Thereafter, the continuously moving linkages 3 move the preheated film into zone D where the linkages 3 are controlled by means of the guide rails 4, 5, 6 and 7. In zone D, the guide rails 4, 5, 6 and 7 are arranged in a specific pattern to cause a stretching of the gripped film 1. The transverse distance between the guide rails 5 and 6 continuously decreases in the direction of the traveling film, the direction of arrow A. At the same time, the guide rails located on one side of the film continuously increase in transverse spacing from the guide rails located on the other side of the film when looking down upon the bed 15 in the direction of the traveling film 1, that is the direction of arrow A as shown in FIGURE 1. Therefore, the hinged portions of each linkage 3 are alternately connected to the guide paths formed by the guide rails in a zig zag fashion so that the hinged portions in one guiding path gradually increases in longitudinal spacing to stretch the film 1 in the longitudinal directional and the entire linkage is transversely moved away from the center of the film to simultaneously stretch the film 1 in the transverse direction. In the stretching zone E, the stretching film 1 is maintained at a predetermined temperature by a suitable heating device (not shown).

Thereafter, the film 1 is fed into zone F, where the film undergoes heat treatment by means of any suitable heating device (not shown) for subsequent travel into zone G where the film is cooled by means of a suitable cooling device (not shown). Upon leaving zone G, the film 1 is fed into zone H, where the tenter chips 2a and 2b are automatically opened by means of an opening guide 10 so that both side edges of the film 1 may be released from the tenter chips.

After the film 1 has undergone the stretching and treatment as mentioned above, it is withdrawn from the linkages 3 by a pair of take out rollers 14a, 14b. The film 1 is subsequently trimmed by means of a trimming device (not shown) and finally wound into a rolled web by means of a suitable winding device (not shown).

The specific construction of the linkages 3 is identical for each of the linkages with the exception that they are mirror images of each other, and shown in detail in FIGURES 2–5. Pairs of vertically aligned outer links are respectively connected at their ends to adjacent pairs of vertically aligned inner links 18, 19 to form a zig zag linkage; the pivotal connections being made by way of link shafts 20 and 21. The distance between the centers of the link shafts 20 and 21 are identical for each of the outer and inner links 16–19. In this manner, a serially connected endless foldable linkage is thus formed by only the links 16–19 and the shafts 20, 21. According to the preferred embodiments, the link shafts 20 and 21 are press fitted into suitable bores in the outer links 16 and 17 to form a rigid connection therewith, and the shafts 20 and 21 are slidably and rotatably mounted within suitable bores provided in the inner links 18 and 19 by means of bearing bushings 22 and 23. The above decribed connected links will hereinafter be referred to as a "master link device" or "main link device."

A supplemental or secondary linkage is formed by a plurality of pairs of vertically aligned outer supplemental links 24, 25 that are connected by means of pins respectively to the inner links 18, 19 by means of hinge pins 27 intermediate the corresponding link shafts 20, 21 so that the outer supplemental links 24 and 25 extend parallel to the outer links 16, 17. Pairs of vertically aligned inner supplemental links 26 are interconnected at one of their ends to the inner side faces of the outer links 16, 17 intermediate the corresponding link shafts 20, 21 by means of pins 27, and are connected at their other ends to corresponding outer supplemental links 24, 25, respectively, by means of hinge pins 28 so that the inner supplemental links 26 extend parallel with the corresponding inner links 18, 19, respectively. The distance between the bore centers of the pins 27 and 28 as measured along a corresponding inner supplemental link is one half of the distance between link shafts 20 and 21 as measured along an inner link 18 or 19. The pins 27 and 28 are preferably press fitted into suitable bores provided in the outer supplemental links 24, 25 to form a rigid connection therewith, and the hinge pins 27, 28 are slidably and rotatably mounted within suitable bores provided in the inner links 18, 19 by means of oil-less bearings 29. The serially interconnected links as described above will be referred to hereinafter as a "secondary link device," "supplemental link device" or "sublink device." Thus, the combined endless zig zag link device comprises the interconnected "master link device" and "secondary link device."

The guidance for the above mentioned linkages includes a roller 31 mounted by means of an anti-friction bearing 30 to the lower end of each of the link shafts 20 and 21 for transverse engagement with the corresponding guide rails 4, 5, 6 and 7. The rollers 31 are protected by means of upper vertically aligned transversely overlapping housings 33 and lower vertically aligned thrust bearings 32 that support the weight of the linkage upon the bed 15. The housings 33 also constitute stopper abutments having a diameter D that is larger than the diameter d of the corresponding roller 31 to protect the corresponding bearing 30 and roller 31 from transverse impact with an adjacent bearing 30 and roller 31. Also, the abutment stoppers 33 regulate the primary pitch, that is the minimum pitch, in the initial gripping of the film to be stretched and provide for a longitudinal abutment of the linkages to push the linkages along the guide rails. The stopper abutments 33 are press fitted with the link shafts 20 and 21 to be rigidly connected therewith.

The ends of the outer links 17 and the outer supplemental links 25 that face the film 1 are extended transversely toward the film 1 and hold at their ends the tenter chips 2a, 2b. As more clearly shown in FIGURES 4 and 5, the upper tenter chip 2a is fixed to the corresponding link 17, 25, and the lower tenter chip 2b is fixed to the lower leg of a corresponding L-shaped lever 34 or 35. The levers 34, 35 are pivotally mounted to their corresponding links by means of press fitted oil-less bearings 7 therein and pivot pins 36 mounted in the corresponding links. A tension spring 38 is connected between the other leg of the L-shaped lever 34 and a spring shoe 40 mounted on the outer link 16 to spring urge the tender chips 2a and 2b into their closed position with a bias force that is sufficiently strong to resist the force exerted by the film 1 during its stretching. Similarly, a tension spring 39 is mounted between the upper end of the other leg of the L-shaped lever 35 and a spring shoe 66 fixed to the corresponding outer supplemental link 24 for spring urging the tenter chips 2a and 2b together with a force sufficient to overcome the disengaging force of the film 1 produced by stretching. Each of the levers 34 and 35 carries a disengaging roller 41 for cooperation with the opening guides 10 and 11. The tenter chips 2a and 2b will be normally spring biased closed by means of their corresponding springs 38 and 39 until the opening rollers 41 are engaged by the cam surfaces of the opening guides 10 or 11 to pivot the levers 34 and 35 in the clockwise direction M as viewed in FIGURES 4 and 5, for opening the tenter ships 2a and 2b to either release or receive, respectively, the film 1. The opening guides 10 and 11 have arcuate cam surfaces and are fixed to the bed 15 in the positions shown in FIGURE 1 for automatically opening the tenter chips.

Figure 2:
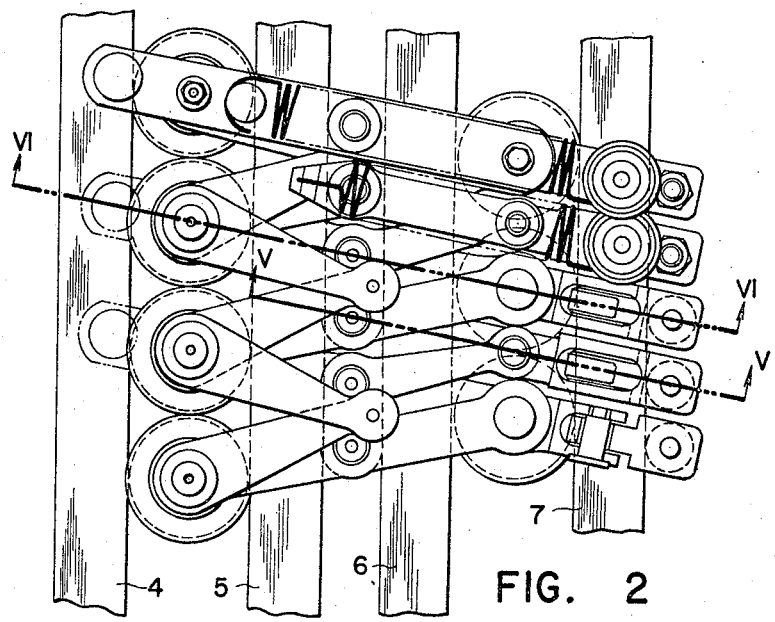
FIGURE 2 is a partial plan view of the linkage shown in FIGURE 1 with the minimum film gripping pitch in the zone D or preheating zone.
Figure 8:
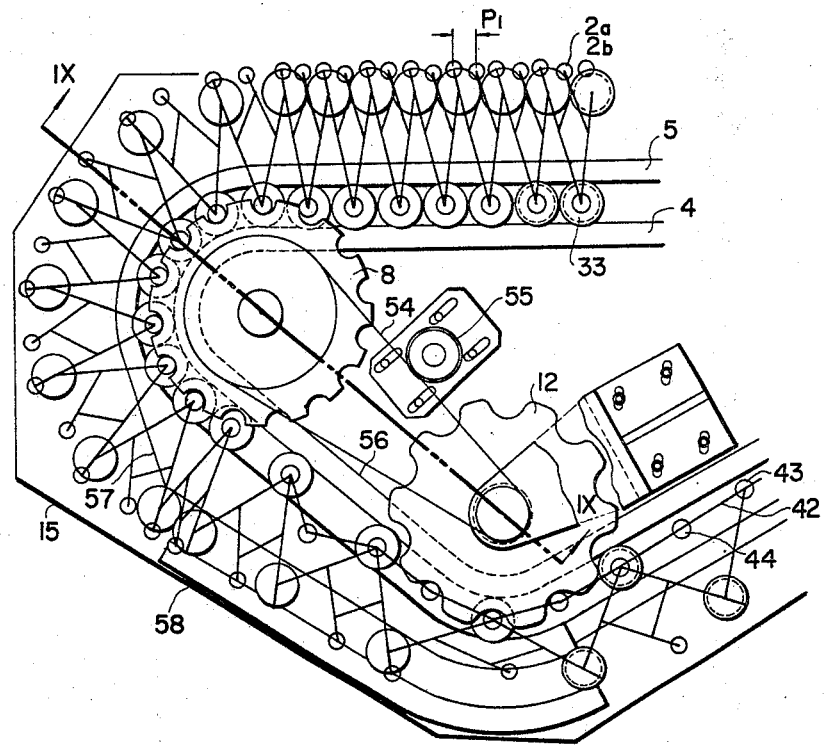
FIGURE 8 is a partial plan view, with a linkage schematically shown, illustrating the driving mechanism within the minimum pitch regulating or controlling zone.
Figure 9:
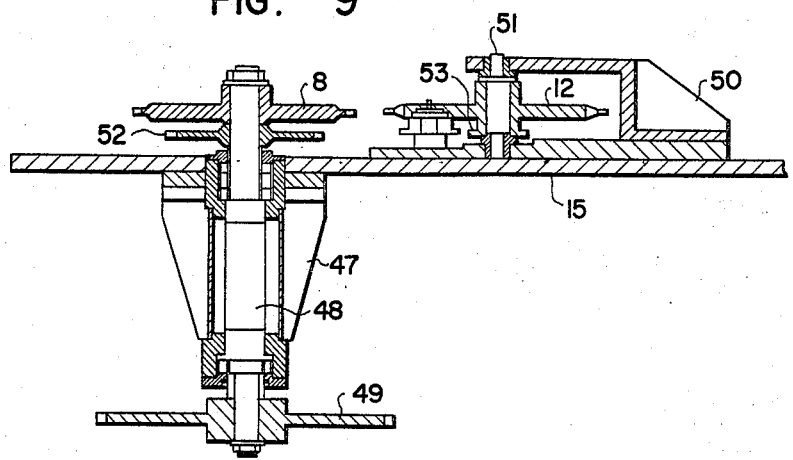
FIGURE 9 is a partial cross sectional view taken along lines IX—IX of FIGURE 8.

The link shafts 21, which are remotely positioned from the tenter chips 2a, 2b are interconnected with each other to form an endless chain 42 having bushings pivotally interconnecting the links of the chain together. The teeth of the sprocket wheels 9, 12 will engage the rollers 43 and 44 that are mounted on the bushings of the chain 42. The portion of the chain that is located with the zones B, C, D and E of FIGURE 1 has the rollers 43 only folded inwardly because of the regulating action produced by the engagement of the teeth of the sprocket wheel 8 and the guiding action of the guide rails provided at the exit of the sprocket wheel 12, as shown in FIGURES 2 and 8. At the end of each outer link 16 that is remote from the tenter chips 2a, 2b there is tightly secured a thrust bearing 45 that will engage a plate 46 that is tightly secured to the bed 14 in the zones C, E, F and G for preventing the linkage from being raised as a result of the downward force exerted upon the tenter chips and levers as the film is stretched in the transverse direction.

In order to insure the high speed operation of the linkages, grease nipples are provided at the various bearing parts for lubrication of the relatively movable portions between the shafts and bushings, and between the ball and roller bearings. Otherwise, oil-less bearings may be utilized so that friction may be decreased and wear prevented.

A so called "master link device" has only been provided for in the prior art. One of the primary features of the present invention resides in that the link device of the present invention is formed of at least a "master link device" and a "secondary link device," whereby the minimum pitch for gripping the film to be stretched can be minimized and the waves produced on both side edges of the stretched film can be decreased in the longitudinal direction; also, high speed operation is a desirable result.

Figure 4:
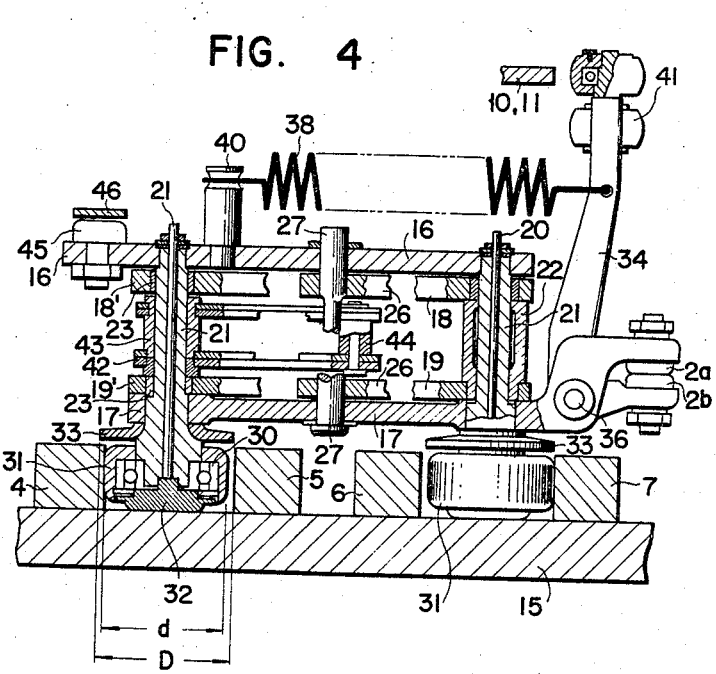
FIGURES 4 and 5 are partial cross sectional views taken along lines VI—VI and V—V, respectively, in FIGURE 2.
Figure 5:
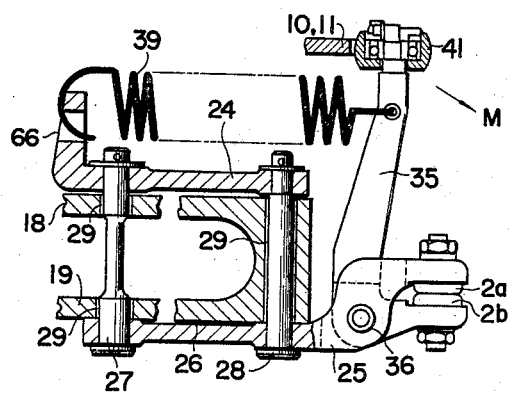
Figure 12:
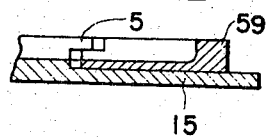
FIGURE 12 is a partial cross sectional view taken along line XII—XII of FIGURE 10.

The details of the stretching apparatus are specifically shown in FIGURES 4, 8 and 12. Each of the linkages 3 is driven by means of sprocket wheels 8 and 12. The sprocket wheels 8 are driven by means of the sprocket wheels 49 that are disposed underneath of the bed 15 and press fitted onto the lower end of a shaft 48 journaled in the bearing 47 of the bed 15. The sprocket wheel 8 is press fitted at the upper end of the shaft 48 to form a driving connection between the sprocket wheels 49 and 8. The sprocket wheel 49 is driven by any suitable means (not shown). The sprocket wheel 12 is rotatably carried by a shaft 51 journaled in a bearing 50 of the bed 15 and is driven by the integral lower sprocket wheel 53. A chain 54 is schematically shown in FIGURE 8 interconnecting the sprocket wheel 53 with a sprocket wheel 52 drivingly connected to the sprocket wheel 8, so that a positive drive is obtained between the sprocket wheels 8 and 12 with a fixed ratio. An idler sprocket wheel 55 is mounted for adjustment transverse to the chain 54 to selectively tighten the chain 54. The sprocket wheel 8 drives the linkage 3 in the clockwise direction of FIGURE 8 so that the abutment stoppers 33 drivingly contact each other to push the linkage forwardly in a positive manner. Each abutment stopper has a diameter equal to twice the minimum pitch and is guided along the rails 4 and 5, which limit the transverse movement of the links to the end of the preheating zone D or the entrance of the stretching zone E. Therefore, the gripping pitch $P_1$ through the preheating zone D is maintained constant and the link driving force is transmitted through the contacting adjacent serially arranged abutment stoppers so that there will be no transverse dissipation of the driving force as will be the case when the links are strongly pushed transversely against the guide rails as in the other zones to be discussed below. Thus, there is no unreasonable force exerted upon the linkages 3 and their travel is relatively smooth through the zones C and D. After the linkages 3 have been pushed through the zone D by the sprocket wheel 8, they are pulled through the stretching zone E by the sprocket wheel 12 acting through a follower or idler sprocket wheel 9. For each of the linkages 3 in the stretching zone, the distance between the rails 5 and 6 is gradually and continuously decreased so that the linkages are correspondingly gradually and continuously expanded to move the tenter chips further apart and stretch the film 1 in the longitudinal direction, and at the same time the group of rails associated with the linkage on one side of the film is gradually and continuously moved transversely relatively away from the group of guide rails associated with the other linkage on the opposite side of the film so that the film will be stretched in the transverse direction. The expansion of the links in the linkage is shown schematically in FIGURE 6(B).

Figure 3:
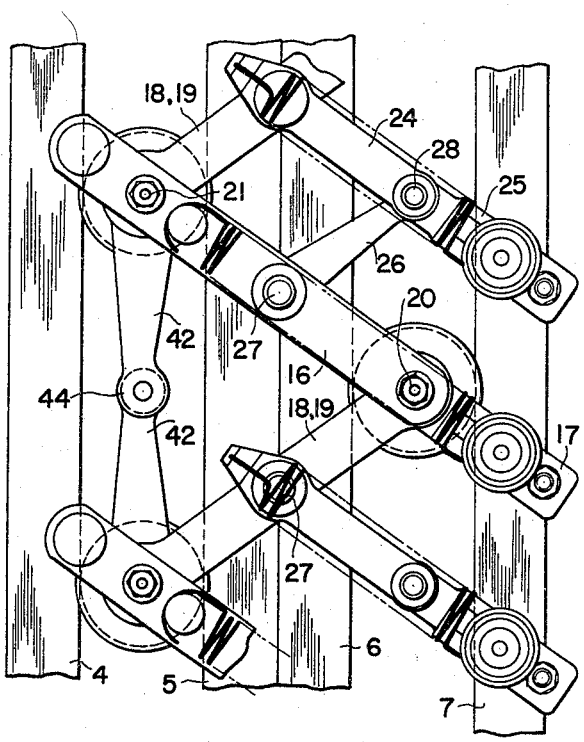
FIGURE 3 is a partial plan view of the linkage of FIGURE 1 having the maximum grip pitch within zone G or the heat treating zone.

Thereafter, the linkages 3 move from the stretching zone E into the heat treatment zone F where they are pulled along solely by the tension force exerted upon the chain 42 that is extended to its full length as shown in FIGURE 3 until the chain rollers 43, 44 move around the idler sprocket wheel 9 and again engages the sprocket wheel 12. Therefore, it is seen that the driving force is dissipated in the transverse direction within the stretching zone E due to the transverse large forces exerted between the rollers 31 and the guide rails 4–7, while the driving forces are direct and not transversely dissipated by the straight chain conveyer drive through the heat treatment zone F and the return to the sprocket wheel 12.

In the heat treatment zone F and the cooling zone G, the guide rails 6 and 7 that are disposed adjacent to the film 1 must be tightly secured in position to the bed 15, because the linkages 3 are caused to raise by the contracting force of the film resulting from its inherent properties. During this operation, the linkages are pulled by the film itself so that the transmitting forces of the links affected by the installation of the guide rails 6 and 7 may be disregarded. On the returning side of the linkages 3, that is between the sprocket wheels 9 and 12, it may be sufficient to provide only the guide rails 4 and 5 on the bed for preventing the zig zag movement of the linkages. In the film pitch minimizing zone B, the linkages are contracted from their maximum pitch to their minimum pitch, because of the difference between the driving speeds of the sprocket wheels 8 and 12, as particularly shown in FIGURE 8. Within the zone B, the rollers 31 of the linkages 3 are moved along the guide rails 56, 57 and 58 while the rollers 43 and 44 of the roller chain 42 engage with the sprocket wheels 12 and 8 to regulate the contraction of the linkages 3. The guide rails 56, 57 and 58 form channels therebetween for receiving the rollers 31 and the distance between the channels is smoothly and regularly enlarged in the direction of the traveling linkages so that the contraction is accomplished smoothly.

The relationship of the sprocket wheels 8 and 12 with respect to the guide rails 56, 57 and 58 is such that when the roller chain 42 engages with the sprocket wheel 12, the roller chain 42 is bent inwardly into the linkage 3, that is, the guide rails 56–58, cause the linkages 3 that are leaving the sprocket wheel 12 to compress toward their minimum pitch while at the same time the sprocket wheel 12 holds the last roller 44 of the chain 42 to assume an overcenter position so that it will thereafter bend inwardly as shown. The minimum pitch corresponds to the pitch of the sprocket wheel 8, while the maximum pitch corresponds to the pitch of the sprocket wheel 12. The sprocket wheel 12 engages the rollers 43 and 44 of the chain 42, while the sprocket wheel 8 only engages the rollers 43 of the chain 42 and the linkages 3 are compressed into their minimum pitch so that the abutment stoppers 33 serially engage each other to produce a driving pushing force toward the zone D from the sprocket wheel 8.

Figure 10:
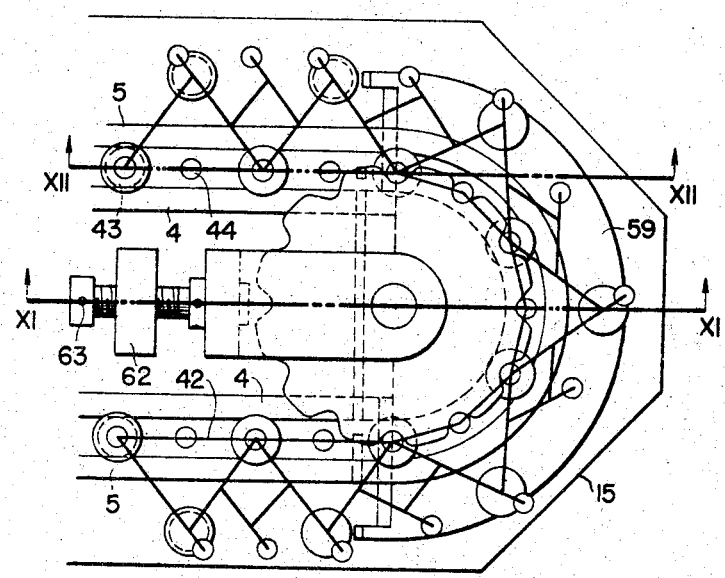
FIGURE 10 is a partial plan view, with a linkage shown schematically, of the follower or idler sprocket wheel mounted at the end of the linkage run.
Figure 11:
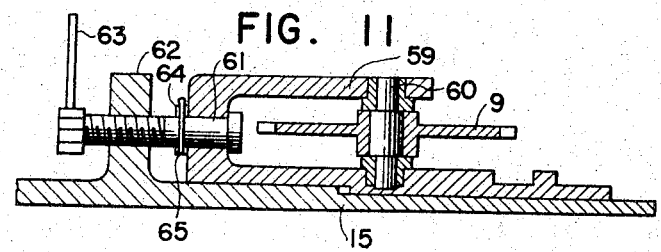
FIGURE 11 is a partial cross sectional view taken along the lines XI—XI of FIGURE 10.

The specific construction of the idler sprocket wheel 9 is shown in detail in FIGURES 10, 11 and 12. The sprocket wheel 9 is press fitted on a shaft 60, which is journaled in a bearing 59 that serves as an adjustable mount for the sprocket wheel 9 with respect to the bed 15. An externally threaded pin 61 has one end freely rotatably mounted and axially secured within a bore in the bearing 59. The other end of the pin 61 is threadably received within the internally threaded bore provided in the supporting plate 62 that is rigidly secured to the bed 15. At the other end of the pin 61, there is provided a handle 63 for turning the pin 61 relative to the supporting plate 62. When the handle 63 is rotated, the sprocket wheel 9 will be moved forwardly or backwardly with respect to the longitudinal travel direction of the film 1, according to the direction of handle rotation. A collar 64 and a knock out pin 65 are provided to prevent axial movement of the pin 61 and allow withdrawal of the pin 61 for replacement or the like. The joint between the guide rails 4, 5 and the bearing 59 is stepped so that the rollers 31 may smoothly pass through the joint, as shown in FIGURE 12, the stepped joint also prevents the bearing 59 from being raised upwardly relative to the bed 15. The joint between the bed 15 and the bearing 59 upon which the thrust bearing 32 is supported for the linkages 3 is constructed so that the channels having the width that is one half of the diameter of the thrust bearing sliding surfaces are joined in a similar stepped joint with respect to each other to thereby permit the smooth passage of the thrust bearing 32. Also, the width of this channel serves for limiting the lateral movement to the bearing 59.

In the prior art apparatuses, the sprocket wheel that corresponds to the sprocket wheel 9 of the present invention is fixed in position, so that when the endless linkages are engaged with the guide rails, a number of the links must be pulled on the exit side of the sprocket wheel corresponding to 9. This will give a considerable impact to the linkages and must be avoided. However, according to the present invention, the sprocket wheel 9 is so disposed and arranged that it may be adjustable forwardly or backwardly in the direction of the film travel to increase or decrease the number of links in the linkages that can be accommodated. Furthermore, according to the present invention the sprocket wheel 9 is an idler sprocket wheel so that the device for driving the sprocket wheel 9 in synchronization with the sprocket wheels 8 and 12 may be economically eliminated in the present invention when compared with the prior art. Moreover, the sprocket wheel 9 may be freely rotated for backlash adjustment.

Figure 6A:
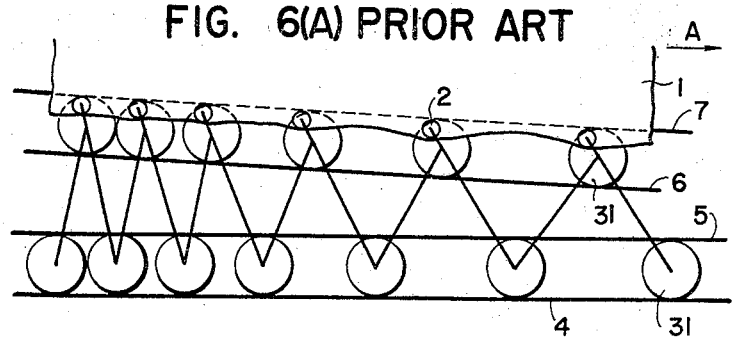
FIGURE 6(A) is a schematic illustration of a prior art linkage stretching a film within the stretching zone.
Figure 6A:
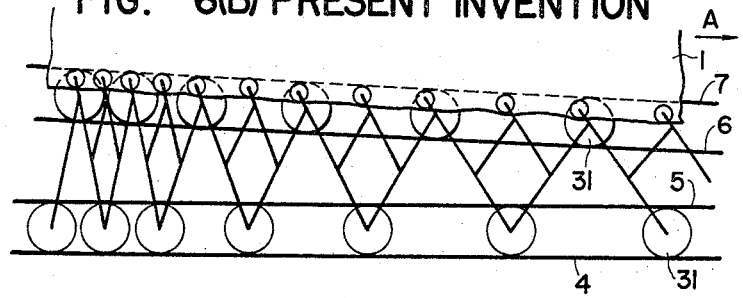
Figure 7:
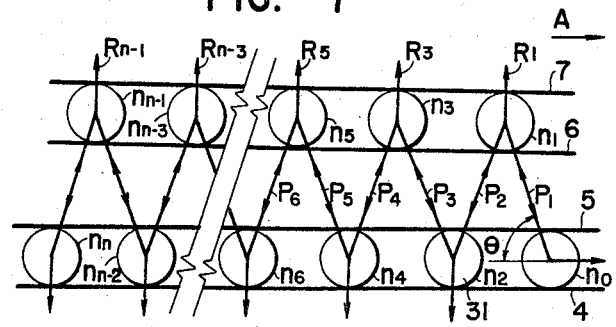
FIGURE 7 is a schematic illustration showing the dissipation of the forces in a conventional or prior art linkage.

The effects of the present invention will be described hereinafter with reference to FIGURES 6 (A) and (B), to illustrate the differences between the prior art and the present invention. The dimension or size of the wave configuration produced along the longitudinal side edges of the stretched film depends upon the pitch $P_2$ of the tenter chips after stretching. It is clear that the smaller the pitch $P_2$, the smaller the deformation of the film wave. When the stretching ratio is to be the same, the pitch $P_2$ can be minimized only by a corresponding minimization of the primary pitch $P_1$ for gripping the film to be stretched. Generally speaking, the primary pitch $P_1$ is determined by the outer diameter of the roller bearings 31 that are secured to the link shafts and guided within the guide rails 4–7 and 56–58 that are disposed on both sides of the film passageway. However, in the prior art stretching apparatus as shown in FIGURE 6(A), the links of the 'master link device" have the same length and move along the guide rails with the angles formed by the mutually adjacent links being enlarged gradually as the linkage is expanded and the load applied to the bearing is determined by the coefficient of friction $\mu$ of the roller bearing and roller 30, 31, the frictional resistance in every slidable part, and the number of links contacting with the guide rails in the stretching zone E or in any of the zones where the links are regulated by the rails. And the life of the bearings is determined by the stretching speed. It will be assumed that the sliding resistance against the bed due to the weight of the linkages, the sliding resistance in the respective hinges and the force required for stretching the film may be neglected. Also, it will be assumed that the links are caused to swing at a fixed rate as shown in FIGURE 7 wherein the guide rails have no inclination therebetween. For these assumptions, the force $P-1$ required for producing the force $P_n$ to the link at the right end in the FIGURE 7 and the load $R_1$ exterted upon the roller-bearing $n_1$ will be designated in the following equations respectively.

$$P_1 = \left(\frac{\cos \theta + \mu \sin \theta}{\cos \theta - \mu \sin \theta}\right)^{n-1} Pn$$

$$R_1 = (P_1 + P_2) \sin \theta = \left(\frac{\cos \theta + \mu \sin \theta}{\cos \theta - \mu \sin \theta}\right)^{n-2} \left(\frac{2 \cos \theta}{\cos \theta - \mu \sin \theta}\right) Pn \sin \theta$$

As shown by the above equations, the transmitted force is dissipated or damped and the force exerted on the bearing will be increased in proportion to the increase in the number of links $n$, the coefficient of friction $\mu$ of the bearing and the angle $\theta$ formed between the guide rail and the link plate having the same length. In such a construction, minimizing the primary film gripping pitch by decreasing the diameter of the bearing and rollers 31, results in increasing the load on the respective bearings due to the increase of the angle $\theta$. In practice, the prior art devices would not give satisfactory results and the primary film gripping pitch cannot be substantially decreased in this manner.

Since the link device of the present invention comprises at least a plurality of "master and secondary link devices," the above disadvantages may be eliminated and the gripping pitch may be decreased by one half without a corresponding increase in the driving force necessary. Furthermore, the life of a linkage can be extended and its components can be made of lighter material to withstand high speed operation, if the outer diameter of the roller-bearings 31 are made larger. Also, the number of links included in the stretching zone having a predetermined length can be decreased since the damping force can be effected by means of the "master links" only and the angle $\theta$ formed by the guide rail and the link can be decreased. Also, according to the present invention, the transmission of the force is effected only by means of the "master link device" and it is sufficient to construct the "secondary link device" strong enough only to withstand the stretching force.

The above specifically described apparatus has been set forth in detail only as a preferred embodiment and other modifications, embodiments and variations are contemplated within the spirit and scope of the present invention as defined by the following claims.

We claim:
1. Apparatus for biaxially stretching a longitudinally continuously traveling stretchable material, comprising: support means for receiving and guiding the stretchable material during its longitudinal traveling; a pair of endless link devices positioned on opposite sides of said support means, each of said link devices comprising at least a plurality of master links and sublinks, said master links being pivotally interconnected with each other into a master link endless chain contractable and expandable in a zig zag fashion, each of said sublinks being pivotally interconnected with another sublink at adjacent ends thereof to form a sublink pair therewith, the other remaining ends of each said sublink pair being pivotally mounted to corresponding ones of said master links midway between the corresponding master link pivots to form a parallelogram on said link device, respective pivotal interconnections of the sublinks of each sublink pair being arranged in a longitudinally extending row longitudinally aligned with every second interconnection of said master links, and the pivot to pivot distance of each of said sublinks being substantially one half of the pivot to pivot distance of each of said master links; drive means acting only upon said master links for moving the link devices transversely away from each other and simultaneously longitudinally expanding each of said master link endless chains; gripping means mounted on each of said every second interconnection of said master links and mounted on each of said interconnections of the sublinks of each sublink pair for successively gripping longitudinal edge portions of the traveling material.

2. The apparatus of claim 1, including a roller mounted on each of said pivotal interconnections of said master links; said driving means including a pair of guide channels on one side of said support means diverging away from the longitudinal material direction in the direction of travel for one link device and a second pair of guide channels on the other side of said support means correspondingly diverging away from the longitudinal material direction in the direction of travel for the other link device within a stretching zone of the apparatus; the guide channels of each pair converging toward each other in the direction of material travel within said stretching zone; one guide channel of each said guide channels pairs receiving therein the rollers mounted on said every second interconnections of said master links and the other guide channel receiving therein the rollers mounted on the other pivotal interconnections of said master links for controlling the contraction and expansion of said master link chain at least within said stretching zone; each of said pivotal interconnections of said master links including a thrust bearing supportingly engaging said support means and a stopper abutment means having a diameter larger than the diameter of the corresponding roller for regulating the pivot to pivot distance between adjacent longitudinally aligned pivotal interconnections of said master links to define by their diameters a minimum pitch distance therebetween.

3. The apparatus of claim 2, wherein each of said every second interconnections of said master links and each of said pivotal interconnections of the sublinks of each sublink pair having an arm portion intergally formed with one of the mutually interconnecting links constituting the interconnection and extending outwardly toward the film material within the stretching zone; each of said gripping means being mounted on a corresponding one of said arm portions.

4. The apparatus of claim 3, wherein each of said endless link devices includes a plurality of pivotally interconnected third link pairs pivotally mounted between adjacent ones of every second interconnection of said master links; the pivot to pivot distance between each of said third links being less than the pivot to pivot distance between each of said master links to constitute said third links means for limiting the expansion of said master link endless chain and determining the maximum pitch of said master link chain.

5. The apparatus of claim 4, wherein the pivots of each third link include a sprocket engaging portion; said driving means including driven sprocket means engaging said sprocket engaging portions and together with said support means pulling said master link endless chains from said stretching zone with said master link chain in its fully extended maximum pitch condition with the driving force being transmitted through only said third links.

6. The device of claim 5, wherein said driving means includes an adjustable sprocket for each of said link devices for adjusting the tension in the corresponding one of said master link endless chains.

7. The apparatus of claim 1, wherein each of said every second interconnections of said master links and each of said pivotal interconnections of the sublinks of each sublink pair having an arm portion intergally formed with one of the mutually interconnecting links constituting the interconnection and extending outwardly toward the film material within the stretching zone; each of said gripping means being mounted on a corresponding one of said arm portions.

8. The apparatus of claim 1, wherein each of said endless link devices includes a plurality of pivotally interconnected third link pairs pivotally mounted between adjacent ones of every second interconnection of said master links; the pivot to pivot distance between each of said third links being less than the pivot to pivot distance between each of said master links to constitute said third links means for limiting the expansion of said master link endless chain and determining the maximum pitch of said master link chain.

9. The apparatus of claim 8, wherein the pivots of each third link include a sprocket engaging portion; said driving means including driven sprocket means engaging said sprocket engaging portions and together with said support means pulling said master link endless chains from said stretching zone with said master link chain in its fully extended maximum pitch condition with the driving force being transmitted through only said third links.

10. The apparatus of claim 9, wherein said driving means includes an adjustable sprocket for each of said link devices for adjusting the tension in the corresponding one of said master link endless chains.

11. The apparatus of claim 2, wherein each of said endless link devices includes a plurality of pivotally interconnected third link pairs pivotally mounted between adjacent ones of every second interconnection of said master links; the pivot to pivot distance between each of said third links being less than the pivot to pivot distance between each of said master links to constitute said third links means for limiting the expansion of said master link endless chain and determining the maximum pitch of said master link chain; said driving means including a first driven sprocket wheel being provided with teeth having a pitch corresponding to said minimum pitch, a second sprocket wheel positively drivingly interconnected with said first sprocket wheel and having a plurality of teeth with a pitch corresponding to said maximum pitch, and a third idler sprocket wheel being adjustable generally transverse to the adjacent master link chain for each of said endless link devices; each of said endless link devices extending in an elongated closed path having opposite ends, said first and second sprocket wheels being mounted at one of said ends and closely adjacent to each other, and said third sprocket wheel being mounted at the opposite end.

12. The apparatus of claim 11, wherein the mounting for said third sprocket wheel including a support plate slidably mounted on said support means and having a portion of said guide channels forming joints with the adjacent fixed portions of said guide channels that horizontally overlap and interengage to provide a smooth transition for said rollers.

13. In the apparatus of claim 1, wherein said gripping means including a first tenter chip rigidly mounted with respect to its associated master link, a second tenter chip including an L-shaped lever pivotally mounted on the associated link, spring means for biasing said second tenter chip L-shaped lever into clamping engagement with its associated first tenter chip, and each of said L-shaped levers and said support means having interengaging cam means for automatically separating the corresponding first and second tenter chips and opening said gripping means against the bias of said spring means at each end of said endless link device.

14. Apparatus for biaxially stretching a longitudinally continuously traveling stretchable material, comprising: support means for supporting the material during its longitudinal traveling through a stretching zone; a pair of endless link devices positioned on opposite transverse sides of said traveling material, each of said link devices comprising a plurality of master links being pivotally interconnected with each other into an endless master link chain contractable and expandable in a zig zag fashion; driving means for each of said endless link devices, including a plurality of pairs of chain links, each pair of chain links including two links pivotally connected at adjacent ones of their ends and pivotally connected at their opposite other ends to every second pivotal interconnection of said master link endless chain; the pivot to pivot distance of each chain link being substantially smaller than the pivot to pivot distance of each master link, to constitute means for limiting the expansion of said master link endless chains, determine the maximum pitch thereof, and solely transmit tension forces in said link devices when having their maximum pitch.

References Cited

UNITED STATES PATENTS

| | | |
|---|---|---|
| 2,923,966 | 2/1960 | Tooke et al. |
| 3,148,409 | 9/1964 | Bruckner et al. |
| 3,195,177 | 7/1965 | Kawamura et al. |
| 3,276,071 | 4/1966 | Nagae et al. |

WILLIAM J. STEPHENSON, Primary Examiner